No. 817,925. PATENTED APR. 17, 1906.
A. LEGLER.
GATE.
APPLICATION FILED SEPT. 14, 1905.
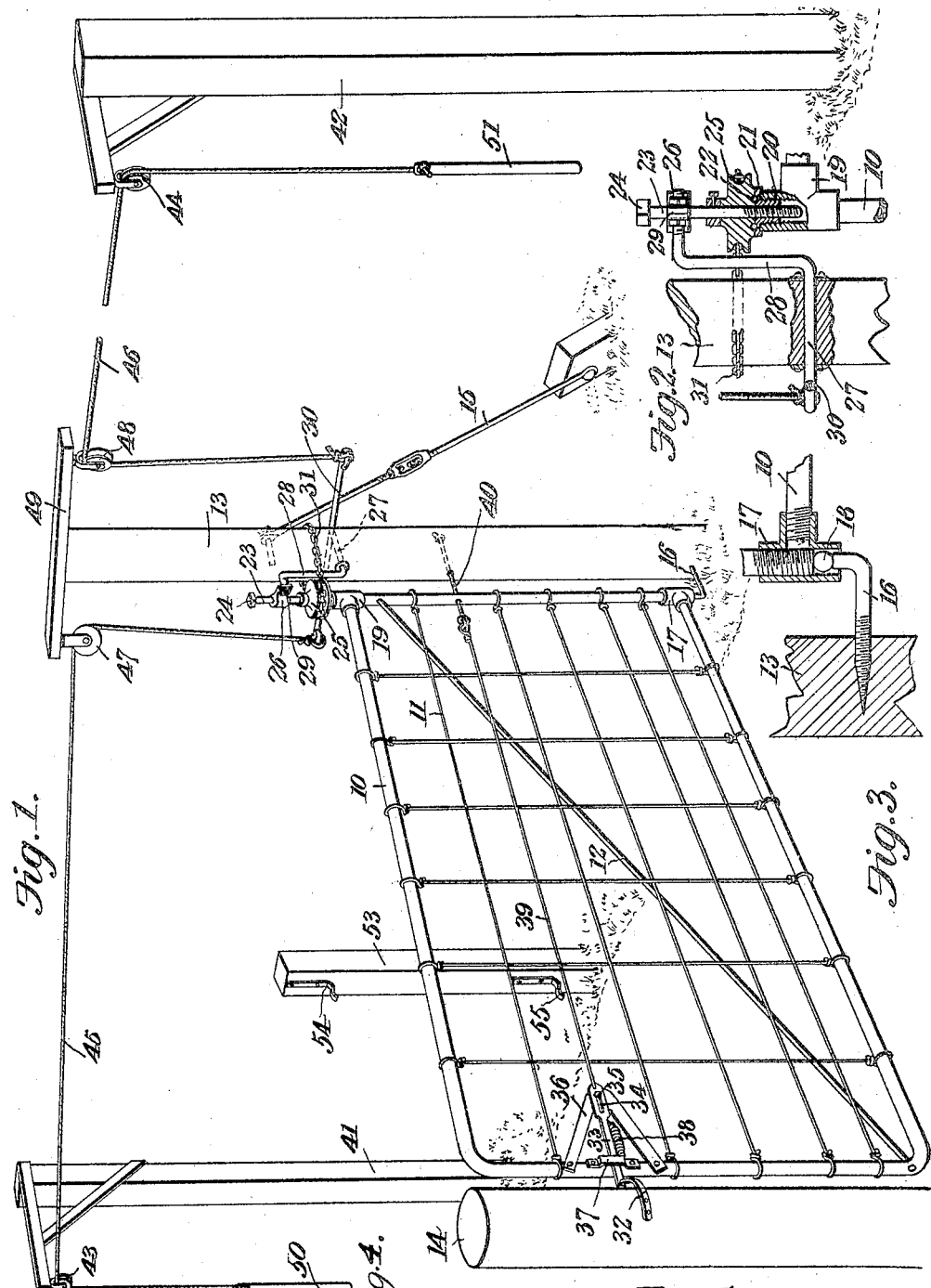
Witnesses
E. K. Stewart,
C. N. Woodward,
Adam Legler Inventor
by C. A. Snow & Co
Attorneys

UNITED STATES PATENT OFFICE.

ADAM LEGLER, OF HASTINGS, NEBRASKA.

GATE.

No. 817,925.  Specification of Letters Patent.  Patented April 17, 1906.

Application filed September 14, 1905. Serial No. 278,464.

*To all whom it may concern:*

Be it known that I, ADAM LEGLER, a citizen of the United States, residing at Hastings, in the county of Adams and State of Nebraska, have invented a new and useful Gate, of which the following is a specification.

This invention relates to gates, more particularly to the class of gates operative from a distance, as from a vehicle approaching from either side, and has for its object to improve the construction and increase the efficiency and utility of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings thus employed, Figure 1 is a perspective view of the improved apparatus. Fig. 2 is an enlarged detail sectional view of a portion of the gate tilting and operating mechanism. Fig. 3 is a sectional detail, enlarged, of the foot portion of the gate-hinge. Fig. 4 is a sectional detail illustrating a modification in the construction of the stud-supporting portion of the device.

The gate portion of the improved device may be of any required size or of any suitable material, but will preferably be of gas-piping 10, with transverse wire members 11 and a straining-rod 12 extending from the diagonally opposite corners of the frame.

The usual hinge-post 13 and latch-post 14 are provided at opposite sides of the gateway-opening and may be of any required size and material. The hinge-post will preferably be supported against the strain of the gate by a stay-rod 15 with a turnbuckle disposed therein to enable the same to be "strained" when required. The post 13 is provided with a bracket 16, having its outer end upturned and entering the corner "T" of the gate and with a bearing-ball 18 between the terminal of bracket and the end member of the gate-frame, as more clearly shown in Fig. 3. By this simple means the friction is materially reduced.

Screwed into the T 19 at the upper hinge-corner of the gate-frame is a reducer member 20, having a flanged upper end 21 with a ball-bearing groove in its upper face for receiving bearing-balls 22, as shown in Fig. 2. Supported in the reducer member 20 is a stud 23, having a "head" 24, upon which a grooved chain or cable pulley 25 rotates, the pulley having a bearing-ball groove in its lower face for bearing upon the balls 22. Slidably disposed upon the stud 23 above the pulley 25 is a collar or sleeve 26, operating with considerable play thereon. Journaled through the post 13 is a shaft 27, having a vertical arm 28 bent to extend through an aperture in a projection 29 on the collar 26 and carrying a lever 30 at the opposite side of the post 13. By this arrangement it will be obvious that the oscillation of the shaft 27 by force applied to the lever 30 will vibrate the arm 28 and move the upper portion of the gate laterally, with the effect of causing the gate to automatically swing to the right or left, as the case may be.

Encircling the post 13 is a chain 31, preferably endless and passing around the pulley 25, and thereby forming a flexible binding means between the gate and post. At the latch end of the gate the post 14 is provided with a notched keeper-plate 32, and the gate-frame is provided with a spring-latch for yieldably engaging this notched keeper. The gate-latch consists of a bar 33, provided with a longitudinal slot 34, operating over a pin 35, projecting from a bracket 36, connected to the gate-frame with the free end of the latch-bar moving beneath a keeper 37 on the gate-frame. A spring 38 holds the latch-bar yieldably in its outward position, operatively engaging the keeper member 32. Connected to the rear end of the latch-bar 33 is a rod 39, to the end of which a section of cable or chain 40 is connected, the free end of the cable-section being in turn connected to the post 13.

By this arrangement while the gate is in closed position the strain is removed from the rod 39 and cable 40, as they extend in longitudinal alinement, as in Fig. 1, and the latch member 33 remains in engagement with the keeper 32 and maintains the gate in closed position.

When the lever member 30 is actuated and the arm 28 moves to the right or left and correspondingly moves the upper portion of the gate-frame, the cable-section 40 will be deflected laterally and draw the latch-bar 33 toward the post 13, and thus open the latch and release the gate and permit it to swing open.

Any suitable means may be employed to operate the lever member 30, but preferably the means shown in Fig. 1 will be employed, consisting of posts 41 42, erected at any required distance from the gate and provided with cable guide-pulleys 43 44, through which cables 45 46 pass, and thence through guide-pulleys 47 48 upon an arm 49, attached to the post 13, and thence to the opposite ends of the lever member 30. The posts 41 42 will be erected adjacent to the roadway convenient to persons upon horseback or in vehicles, so that they can easily reach the handle ends 50 51 of the draw-cable without alighting. The cable 45 46 may be extended for any distance, as will be obvious. As the driver approaches the gate he draws upon the nearest handle member 50 51, as the case may be, and causes the gate to open away from his vehicle, and after passing through he draws upon the other handle member, and thus reverses the position of the gate and causes it to automatically close.

The apparatus is simple in construction, strong and durable, and easily mounted and operated.

An intermediate post 53 is disposed in the path of the gate when open and provided with resilient catches 54 55 to catch and hold the gate in open position, but which will yield when pressure is applied to close the gate. If preferred, the member 21 may be coupled to an independent or second reducer, as at 56, Fig. 3, where larger piping is required for the gate structure.

Having thus described the invention, what is claimed is—

1. In a gate, a supporting-post, a gate hinged at the lower corner to said post and provided at the adjacent upper corner with a projecting stud, an arm swinging from said post with its free end movably engaging said stud, a binding-chain inclosing said post and coupled to said gate, and means for swinging said arm.

2. In a gate, a supporting-post, a gate hinged at the lower corner to said post and provided at the adjacent upper corner with a projecting stud, an arm swinging from said post with its free end movably engaging said stud, a chain-pulley carried by said stud, an endless chain operating on said pulley and encircling said post, and means for swinging said arm.

3. In a gate, a hinge-post and a latch-post disposed at opposite sdes of a gateway-opening, a gate hinged at one lower corner and swinging laterally at the adjacent upper corner relative to said hinge-post and with an aperture transversely of the hinge-stile, means for swinging said post laterally upon its hinged corner, a latch-keeper carried by the latch-post, a latch element movably disposed upon said gate, a spring operating to maintain said latch element in projected position for engagement with said keeper, a flexible element connected to said hinge-post and extending slidably through the aperture in the hinge-stile of the gate and connected to the latch element, whereby when the gate is tilted upon its hinged corner the flexible element will be deflected laterally and draw the latch element longitudinally of the gate.

4. In a gate, a supporting-post, a gate hinged at the lower corner to said post and provided at the adjacent upper corner with a projecting stud, a sleeve slidable on said stud, an arm swinging from said post with its free end movably engaging said sleeve and means for actuating said arm.

In testimony that I claim the foregoing as my own I have hereto affixed my signature in the presence of two witnesses.

ADAM LEGLER.

Witnesses:
 WM. MADGETT,
 W. T. BLACKMAN.